United States Patent
Chang

(10) Patent No.: US 9,588,623 B2
(45) Date of Patent: Mar. 7, 2017

(54) TOUCH SENSOR AND DISPLAY DEVICE

(71) Applicant: Shenzhen China Star Optoelectronics Technology Co., Ltd., Shenzhen, Guangdong (CN)

(72) Inventor: Chun-Kai Chang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 154 days.

(21) Appl. No.: 14/436,441

(22) PCT Filed: Jan. 8, 2015

(86) PCT No.: PCT/CN2015/070345
§ 371 (c)(1),
(2) Date: Apr. 16, 2015

(87) PCT Pub. No.: WO2016/095296
PCT Pub. Date: Jun. 23, 2016

(65) Prior Publication Data
US 2016/0179240 A1    Jun. 23, 2016

(30) Foreign Application Priority Data
Dec. 18, 2014 (CN) .......................... 2014 1 0802036

(51) Int. Cl.
G06F 3/045 (2006.01)
G06F 3/044 (2006.01)
G06F 3/041 (2006.01)

(52) U.S. Cl.
CPC ............ *G06F 3/044* (2013.01); *G06F 3/0412* (2013.01); *G06F 3/0416* (2013.01); *G06F 2203/04103* (2013.01); *G06F 2203/04112* (2013.01)

(58) Field of Classification Search
None
See application file for complete search history.

(56) References Cited

U.S. PATENT DOCUMENTS

2014/0111709 A1* 4/2014 Kim .................... G02F 1/13338
349/12
2014/0347319 A1* 11/2014 Lin ........................ G06F 3/044
345/174

* cited by examiner

*Primary Examiner* — Srilakshmi K Kumar
*Assistant Examiner* — Ifedayo Iluyomade
(74) *Attorney, Agent, or Firm* — Andrew C. Cheng

(57) ABSTRACT

A touch sensor comprises first and second touch electrode stings. Each first touch electrode string comprises the same number of first touch electrodes in a first direction. Two adjacent first touch electrodes connect by a first or second conductive bridge. The resistance of the bridges is different to adjust the mutual capacitance such that the mutual capacitance or the difference of the mutual capacitance of the first touch electrode strings is the same or within a first predetermined range. Each second touch electrode string comprises the same number of second touch electrodes arranged in a second direction. Two adjacent second touch electrodes connect by a third or forth conductive bridge. The resistance of the bridges is different to adjust the mutual capacitance such that the mutual capacitance or the difference of the mutual capacitance of the second touch electrode strings is the same or within a second predetermined range.

18 Claims, 6 Drawing Sheets

TOUCH SENSOR AND DISPLAY DEVICE

CROSS REFERENCE TO RELATED APPLICATIONS

This application claims the benefit of, and priority to, Chinese Patent Application No. 201410802036.1, filed Dec. 18, 2014, titled "Touch Sensor and Display Device", the entire contents of which are incorporated by reference herein in its entirety.

BACKGROUND OF THE INVENTION

1. Field of the Invention

The disclosure is related the field of electronics, and more particularly to touch sensors and a display device.

2. The Related Arts

Touch sensors are arranged at the display device, e.g. liquid crystal display (LCD) apparatus, filed emission display (FED) apparatus, plasma display panel (PDP), organic light emitting display (OLED) apparatus and electrophoretic display apparatus. When the user watches the display device, touch sensors can be used to input the predetermined message as an input apparatus by pressing or touching the screen of the display device. Touch sensors are composed of a plurality of lateral touch electrode strings and vertical touch electrode strings. The difference on the arrangement of the periphery wirings for connecting the touch electrode strings causes unbalance on the mutual capacitance between the touch electrode strings such that the touch performance of the display device is affected.

SUMMARY OF THE INVENTION

The embodiment of the disclosure provides a touch sensor and a display panel, so that the touch performance of the display device could be improved.

In order to achieve the above purpose, the disclosure provides the following technical solutions.

According to an embodiment of the disclosure, the disclosure provides a touch sensor for a display device comprises:

a plurality of first touch electrode strings arranged in parallel; each first touch electrode string comprising the same number of first touch electrodes arranged in a first direction; a first conductive bridge or a second conductive bridge connecting two adjacent first touch electrodes in the first touch electrode strings respectively, wherein the resistance of the first conductive bridge is different from the resistance of the second conductive bridge to adjust the mutual capacitance between the plurality of first touch electrode strings so that the mutual capacitance of the plurality of first touch electrode strings is in the same value or the difference between the mutual capacitance of the plurality of first touch electrode strings is within a first predetermined range; the number of the first touch electrode strings is a natural number larger than 1; and a plurality of second touch electrode strings arranged in parallel and isolated from the plurality of first touch electrode strings; each second touch electrode string comprising the same number of second touch electrodes arranged in a second direction crossing with the first direction; a third conductive bridge or a fourth conductive bridge connecting two adjacent second touch electrodes in the second touch electrode strings respectively, wherein the resistance of the third conductive bridge is different from the resistance of the forth conductive bridge to adjust the mutual capacitance in the plurality of second touch electrode strings so that the mutual capacitance of the plurality of second touch electrodes is in the same value or the difference between the mutual capacitance of the plurality of second electrode touch electrode string is within a second predetermined range.

In one embodiment of the touch sensor, the touch sensor further comprises a pad group, a first group of wiring and a second group of wiring; wherein the pad group, the first group of wiring, and the second group of wiring are disposed at the external region of a region formed by the first touch electrode strings and the second touch electrode strings; the first group of wiring corresponding to the plurality of first touch electrode strings; each first touch electrode string connecting to a corresponding pad of the pad group through a corresponding wiring in the first group of wiring; the second group of wiring corresponding to the plurality of second touch electrode strings; each second touch electrode string connecting to a corresponding pad of the pad group through a corresponding wiring in the second group of wiring; wherein the number of the first conductive bridges connecting the first touch electrode string is directly proportional to the length of the corresponding wiring connecting the first and the second touch electrode string when the resistance of the first conductive bridges is smaller than the conductivity of the second conductive bridges.

In one embodiment of the touch sensor, the touch sensor further comprises a first conductive medium and a second conductive medium; the first conductive medium disposed in the first touch electrode of the first touch electrode string to adjust the mutual capacitance of the plurality of first touch electrode strings so that the mutual capacitance of the plurality of the first touch electrode strings is in the same value or the difference between the mutual capacitance of the plurality of the first touch electrode string is within the first predetermined range; the second conductive medium disposed in the second touch electrode of the plurality of the second touch electrode strings to adjust the mutual capacitance of the plurality of second touch electrode strings so that the mutual capacitance of the plurality of second touch electrode strings is in the same value or the difference between the mutual capacitance of the plurality of second touch electrode string is within the second predetermined range.

In one embodiment of the touch sensor, in the plurality of first touch electrode strings and the plurality of second touch electrode strings, the amount of the first conductive medium disposed in the first touch electrode string is directly proportional to the length of the corresponding wiring connecting the first touch electrode string; the amount of the second conductive medium disposed in the second touch electrode string is directly proportional to the length of the corresponding wiring connecting the second touch electrode string.

In one embodiment of the touch sensor, the first and second conductive medium in the plurality of first and second touch electrode strings is a metal wire respectively; the total length of the wire disposed in the first and the second touch electrode strings is directly proportional to the length of the corresponding wiring connecting the first and the second touch electrode string respectively.

In one embodiment of the touch sensor, the material of the first conductive bridge and the material of the third conductive bridge are the same; the material of the second conductive bridge and the material of the fourth conductive bridge are the same.

In one embodiment of the touch sensor, the material of the first conductive bridge and the material of the third conductive bridge are metal; the material of the second conductive bridge and the material of the fourth conductive bridge are Indium Tin Oxide.

In one embodiment of the touch sensor, the first predetermined range and the second predetermined range are the same.

In one embodiment of the touch sensor, the touch sensor further comprises an upper substrate; wherein the plurality of first touch electrode strings and second touch electrode strings are formed on the upper substrate.

The disclosure further provides a display device comprising a display panel, a sealant and a touch sensor; the sealant for adhering the touch sensor to the display panel; the touch sensor comprising:

a plurality of first touch electrode strings arranged in parallel; each first touch electrode string comprising the same number of first touch electrodes arranged in a first direction; a first conductive bridge or a second conductive bridge connecting two adjacent first touch electrodes in the first touch electrode strings respectively, wherein the resistance of the first conductive bridge is different from the resistance of the second conductive bridge to adjust the mutual capacitance between the plurality of first touch electrode strings so that the mutual capacitance of the plurality of first touch electrode strings is in the same value or the difference between the mutual capacitance of the plurality of first touch electrode strings is within a first predetermined range; the number of the first touch electrode strings is a natural number larger than 1; and a plurality of second touch electrode strings arranged in parallel and isolated from the plurality of first touch electrode strings; each second touch electrode string comprising the same number of second touch electrodes arranged in a second direction crossing with the first direction; a third conductive bridge and/or a fourth conductive bridge connect two adjacent second touch electrodes in the second touch electrode strings respectively, wherein the resistance of the first conductive bridge is different from the resistance of the second conductive bridge to adjust the mutual capacitance in the plurality of second touch electrode strings so that the mutual capacitance of the plurality of second touch electrodes is in the same value or the difference between the mutual capacitance of the plurality of second electrode touch electrode string is within a second predetermined range.

In one embodiment of the display device, the touch sensor further comprises a pad group, a first group of wiring and a second group of wiring; wherein the pad group, the first group of wiring, and the second group of wiring are disposed at the external region of a region formed by the first touch electrode strings and the second touch electrode strings; the first group of wiring corresponding to the plurality of first touch electrode strings; each first touch electrode string connecting to a corresponding pad of the pad group through a corresponding wiring in the first group of wiring; the second group of wiring corresponding to the plurality of second touch electrode strings; each second touch electrode string connecting to a corresponding pad of the pad group through a corresponding wiring in the second group of wiring; wherein the number of the first conductive bridges connecting the first touch electrode string is directly proportional to the length of the corresponding wiring connecting the first and the second touch electrode strings when the resistance of the first conductive bridges is smaller than the conductivity of the second conductive bridges.

In one embodiment of the display device, the touch sensor further comprises a first conductive medium and a second conductive medium; the first conductive medium disposed in the first touch electrode of the first touch electrode string to adjust the mutual capacitance of the plurality of first touch electrode strings so that the mutual capacitance of the plurality of the first touch electrode strings is in the same value or the difference between the mutual capacitance of the plurality of the first touch electrode string is within the first predetermined range; the second conductive medium disposed in the second touch electrode of the plurality of the second touch electrode strings to adjust the mutual capacitance of the plurality of second touch electrode strings so that the mutual capacitance of the plurality of second touch electrode strings is in the same value or the difference between the mutual capacitance of the plurality of second touch electrode string is within the second predetermined range.

In one embodiment of the display device, in the plurality of first touch electrode strings and the plurality of second touch electrode strings, the number of the first conductive medium disposed in the first touch electrode strings is directly proportional to the length of the corresponding wiring connecting the first touch electrode string; the number of the second conductive medium disposed in the second touch electrode strings is directly proportional to the length of the corresponding wiring connecting the second touch electrode strings.

In one embodiment of the display device, the first and second conductive medium in the plurality of first and second touch electrode strings is a metal wire respectively; the total length of the wire disposed in the first and the second touch electrode strings is directly proportional to the length of the corresponding wiring connecting the first and the second touch electrode string respectively.

In one embodiment of the display device, the material of the first conductive bridge and the material of the third conductive bridge are the same; the material of the second conductive bridge and the material of the fourth conductive bridge are the same.

In one embodiment of the display device, the material of the first conductive bridge and the material of the third conductive bridge are metal; the material of the second conductive bridge and the material of the fourth conductive bridge are Indium Tin Oxide.

In one embodiment of the display device, the first predetermined range and the second predetermined range are the same.

In one embodiment, the touch sensor further comprises an upper substrate; wherein the plurality of first touch electrode strings and second touch electrode strings are formed on the upper substrate.

The touch sensor of the present disclosure comprises a plurality of first touch electrode strings arranged in parallel and a plurality of second touch electrode strings arranged in parallel, wherein the second touch electrode strings are isolated from the first touch electrode strings. Each first touch electrode string comprises the same number of first touch electrodes. The first touch electrodes are arranged in the first direction. The first conductive bridge or the second conductive bridge connects two adjacent first touch electrodes in the first touch electrode strings. The resistance of the first conductive bridge is different from the resistance of the second conductive bridge to adjust the mutual capacitance between the plurality of first touch electrode strings so that the mutual capacitance of the plurality of first touch electrode strings is in the same value or the difference of the mutual capacitance between the plurality of first touch electrode strings is within the first predetermined range. Each second touch electrode string comprises the same number of second touch electrodes arranged in the second direction crossing with the first direction; the third conductive bridge or the fourth conductive bridge connects two adjacent second touch electrodes in the second touch electrode strings. The resistance of the third conductive bridge is different from the resistance of the fourth conductive bridge to adjust the mutual capacitance between the plurality of second electrode strings so that the mutual capacitance of the plurality of second electrode strings is in the same value or the difference of the mutual capacitance between the plurality of second electrode strings is within a second predetermined range. Therefore, the mutual capacitance between the first touch electrode strings of the touch sensor or the second touch electrode strings of the touch sensor is the same or the difference of the mutual capacitance between the first touch electrode strings or the second touch electrode strings is within the first predetermined range or the second predetermined range such that the mutual capacitance of the touch sensor is balanced to further improve the touch performance of the touch sensor.

BRIEF DESCRIPTION OF THE DRAWINGS

In order to more clearly illustrate the prior art or the embodiments or aspects of the practice of the disclosure, the accompanying drawings for illustrating the prior art or the embodiments of the disclosure are briefly described as below. It is apparently that the drawings described below are merely some embodiments of the disclosure, and those skilled in the art may derive other drawings according to the drawings described below without creative endeavor.

DETAILED DESCRIPTION OF THE PREFERRED EMBODIMENTS

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

Figure 1:
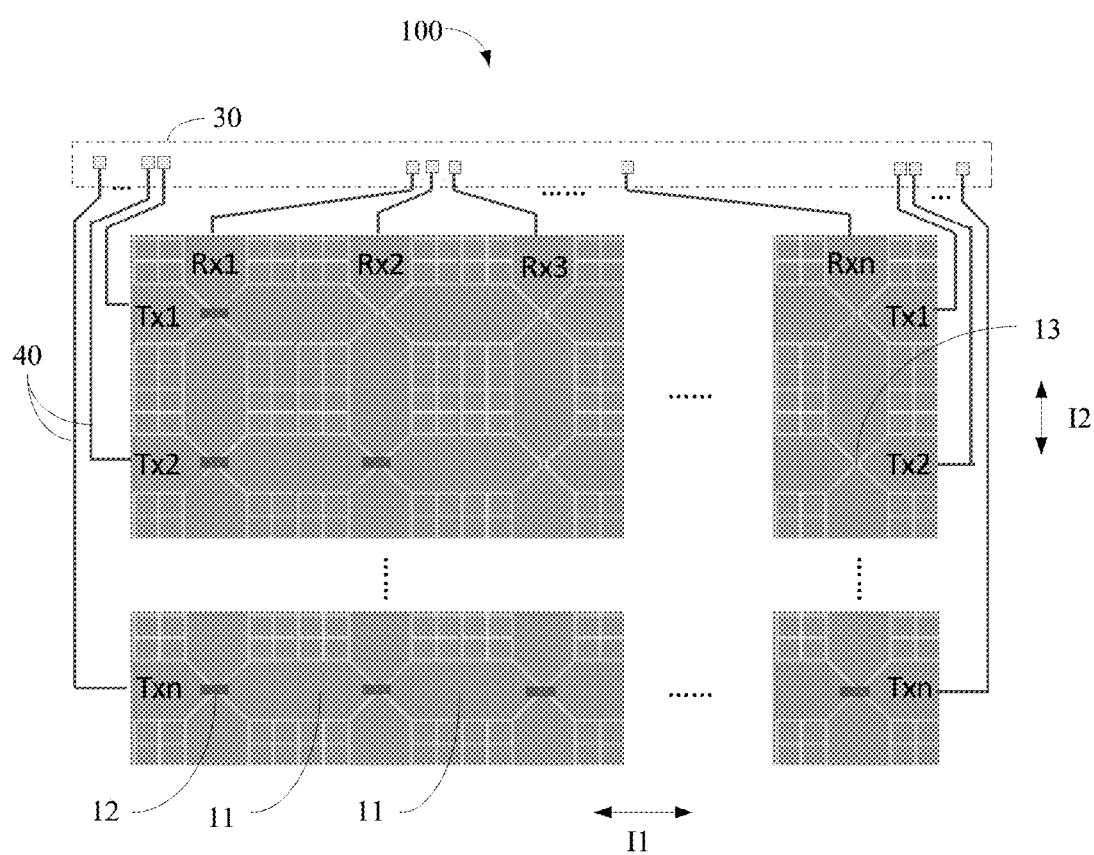
FIG. 1 is a first schematic plan view of the touch sensor according to the first embodiment of the first solution of the disclosure.
Figure 2:
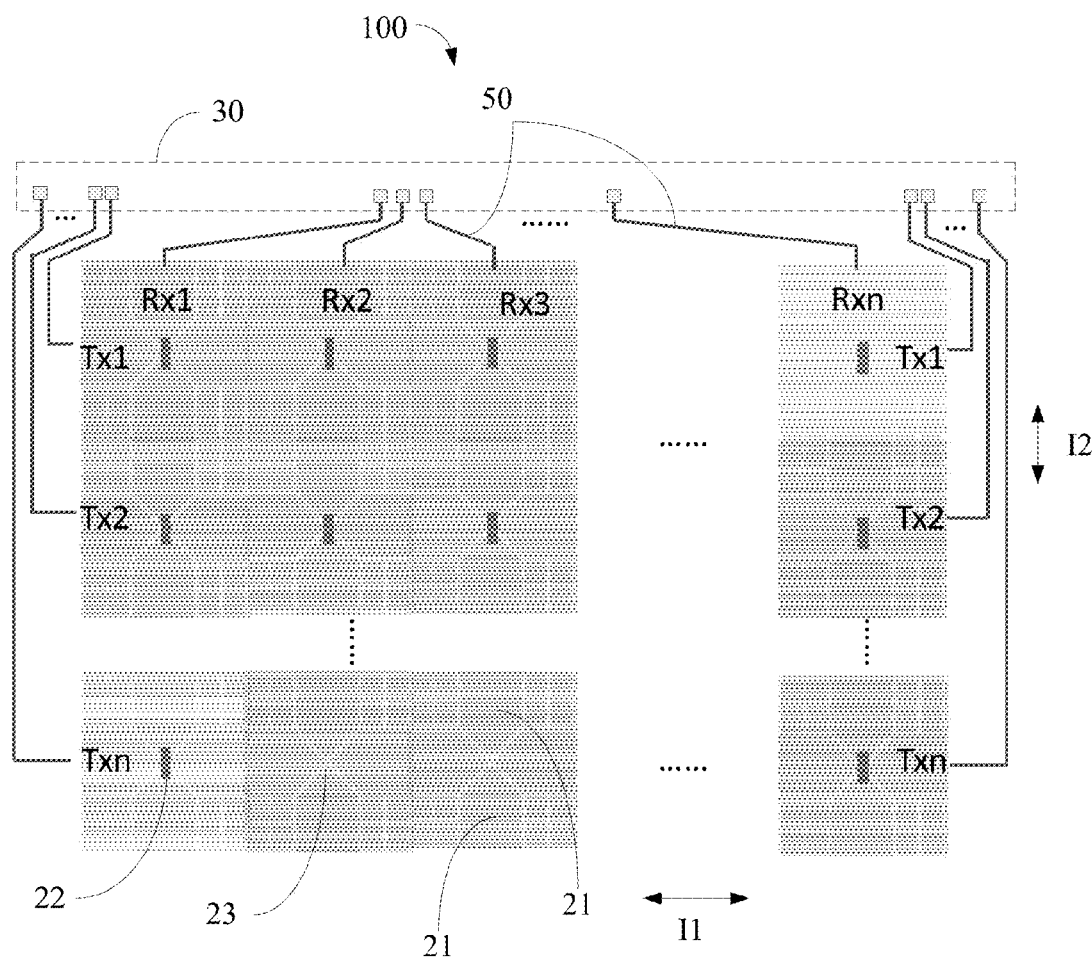
FIG. 2 is a second schematic plan view of the touch sensor according to the first embodiment of the first solution of the disclosure.

Refer to FIG. 1 and FIG. 2. The embodiment of the present disclosure provides a touch sensor 100 for the display device (not shown). The touch sensor 100 comprises a plurality of first touch electrode strings Tx1-Txn arranged in parallel and a plurality of second touch electrode strings Rx1-Rxn arranged in parallel, wherein the second touch electrode strings Rx1-Rxn are isolated from the first touch electrode strings Tx1-Txn.

Each first touch electrode string comprises the same number of first touch electrodes 11. The first touch electrodes 11 are arranged in the first direction I1. The first conductive bridge 12 or the second conductive bridge 13 connects two adjacent first touch electrodes 11 in the first touch electrode strings. The resistance of the first conductive bridge 12 is different from the resistance of the second conductive bridge 13 to adjust the mutual capacitance between the plurality of first touch electrode strings Tx1-Txn such that the mutual capacitance between the plurality of first touch electrode strings Tx1-Txn is in the same value or the difference of the mutual capacitance between the plurality of first touch electrode strings Tx1-Txn is within the first predetermined range.

Refer to FIG. 2. Each second touch electrode string comprises the same number of second touch electrodes 21 arranged in the second direction I2 crossing with the first direction I1. The third conductive bridge 22 or the fourth conductive bridge 23 connects two adjacent second touch electrodes 21 in the second touch electrode strings. The resistance of the third conductive bridge 22 is different from the resistance of the fourth conductive bridge 23 to adjust the mutual capacitance between the plurality of second touch electrode strings Rx1-Rxn so that the mutual capacitance between the plurality of second touch electrode strings Rx1-Rxn is in the same value or the difference of the mutual capacitance between the plurality of second touch electrode strings Rx1-Rxn is within a second predetermined range.

Two adjacent first touch electrodes 11 in each first touch electrode string are connected through either the first conductive bridge 12 or the second conductive bridge 13. The amount of the first conductive bridge 12 and the amount of the second conductive bridge 13 are the same. Two adjacent second touch electrodes 21 in each second touch electrode string are connected through either the third conductive bridge 22 or the fourth conductive bridge 23. The amount of the third conductive bridge 22 and the amount of the fourth conductive bridge 14 are the same. In one embodiment of the present disclosure, the first direction I1 is perpendicular to the second direction I2. FIG. 1 is a plan view of the layer on which the plurality of the first touch electrode series Tx1-Txn is located. FIG. 2 is a plan view of the layer on which the plurality of the second touch electrode series Rx1-Rxn is located.

Specifically, the material of the first conductive bridges 12 and the material of the third conductive bridges 22 are the same. The material of the second conductive bridges 13 and the material of the fourth conductive bridges 23 are the same. The material of the first conductive bridges 12 and the material of third conductive bridges 22 are metal. The material of the second conductive bridges 13 and the material of the fourth conductive bridges 23 are Indium Tin Oxide. In another embodiment of the present disclosure, the material of the first conductive bridges 12 and the material of the third conductive bridges 22 may be different. The material of the second conductive bridges 13 and the material of the fourth conductive bridges 23 may be different. The first predetermined range and the second predetermined range may be different. The first predetermined range and the second predetermined range may also be different and be confirmed according to the actual demand.

In one embodiment of the present disclosure, the touch sensor 100 comprises the plurality of first touch electrode strings Tx1-Txn arranged in parallel and the plurality of second touch electrode strings Rx1-Rxn arranged in parallel, wherein the second touch electrode strings Rx1-Rxn are isolated from the first touch electrode strings Tx1-Txn. Each first touch electrode string comprises the same number of first touch electrodes 11. The first touch electrodes 11 are arranged in the first direction I1. The first conductive bridge 12 or the second conductive bridge 13 connects two adjacent first touch electrodes 11 in the first touch electrode strings Tx1-Txn. The resistance of the first conductive bridge 12 is different from the resistance of the second conductive bridge 13 to adjust the mutual capacitance of the plurality of first touch electrode strings Tx1-Txn so that the mutual capacitance between the plurality of the first electrode strings Tx1-Txn is in the same value or the difference of the mutual capacitance between the plurality of the first electrode strings Tx1-Txn is within the first predetermined range. Each second touch electrode string comprises the same number of second touch electrodes 21 arranged in the second direction I2 crossing with the first direction I1; the third conductive bridge 22 or the fourth conductive bridge 23 connects two adjacent second touch electrodes 21 in the second touch electrode strings Rx1-Rxn. The resistance of the third conductive bridge 22 is different from the resistance of the fourth conductive bridge 23 to adjust the mutual capacitance of the plurality of second touch electrode strings Rx1-Rxn such that the mutual capacitance of the plurality of second touch electrode strings Rx1-Rxn is the same value or the difference of the mutual capacitance of the plurality of second touch electrode strings Rx1-Rxn is within a second predetermined range. Therefore, the mutual capacitance between the first touch electrode strings Tx1-Txn of the touch sensor 100 or the second touch electrode strings Rx1-Rxn of the touch sensor 100 is the same of the difference of the mutual capacitance between the first touch electrode strings Tx1-Txn or the second touch electrode strings Rx1-Rxn is within the first predetermined range or the second predetermined range such that the mutual capacitance of the touch sensor 100 is balanced to further improve the touch performance of the touch sensor 100.

Specifically, the touch sensor 100 comprises a pad group 30, a first group of wiring 40 and a second group of wiring 50. The pad group 30, the first group of wiring 40, and the second group of wiring 50 are disposed at the external region of the region formed by the first touch electrode strings Tx1-Txn and the second touch electrode strings Rx1-Rxn. The first group of wiring 40 corresponds to the plurality of first touch electrode strings Tx1-Txn. Each first touch electrode string connects a pad of the pad group 30 through a corresponding wiring in the first group of wiring 40 of the first touch electrode string. The second group of wiring 50 corresponds to the plurality of second touch electrode strings Rx1-Rxn. Each second touch electrode string connects a pad of the pad group 30 through a corresponding wiring in the second group of wiring 50 of the second touch electrode string. The number of the first conductive bridges 12 connecting the first touch electrode strings Tx1-Txn is directly proportional to the length of the corresponding wirings connecting the first touch electrode strings Tx1-Txn and the second touch electrode strings Rx1-Rxn when the resistance of the first conductive bridges 12 is smaller than the conductivity of the second conductive bridges 13. The number of the first conductive bridges 12 connecting the first touch electrode strings Tx1-Txn is directly proportional to the length of the corresponding wiring connecting the first touch electrode strings Tx1-Txn and the second touch electrode strings Rx1-Rxn when the resistance of the first conductive bridges 12 is smaller than the conductivity of the second conductive bridges 13.

Specifically, the first end of the wiring in the first group of wiring 40 connects the corresponding first touch electrode string; the second end of the wiring connects the corresponding pad. The length of the corresponding wirings is different because the distance between the first touch electrode strings and the pad group 30 is different. The longer the length of the wiring, the greater the resistance. When the resistance of the first conductive bridges 12 is smaller than the conductivity of the second conductive bridges 13, the number of the first conductive bridges 12 connecting the first touch electrode strings Tx1-Txn is directly proportional to the length of the corresponding wiring connecting the first touch electrode strings Tx1-Txn and the second touch electrode strings Rx1-Rxn. The number of the first conductive bridge 12 in the first touch electrode string with the longer wiring is less than the number of the first conductive bridge 12 in the first touch electrode string with the shorter wiring. That is to say that the resistance of the first touch electrode string with the longer wiring is smaller than the resistance of the first touch electrode string with the shorter wiring. The number of the third conductive bridge 22 in the second touch electrode string with the longer wiring is less than the number of the third conductive bridge 22 in the second touch electrode string with the shorter wiring. That is to say that the resistance of the second touch electrode string with the longer wiring is smaller than the resistance of the first touch electrode string with the shorter wiring. Thus, the peripheral wiring and corresponding first and second touch electrode strings are integrated as a whole. The first touch electrode strings Tx1-Txn and second touch electrode strings Rx1-Rxn may make the mutual capacitance be balanced and increase the performance of the touch sensor 100.

Figure 3:
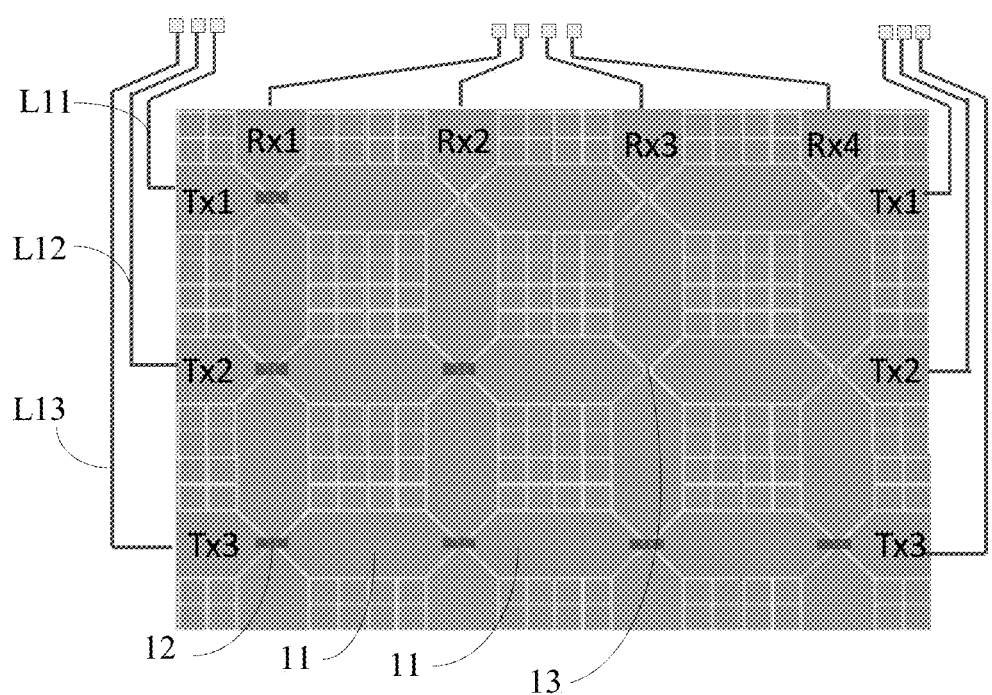
FIG. 3 is the first schematic plan view of the specific embodiment.
Figure 4:
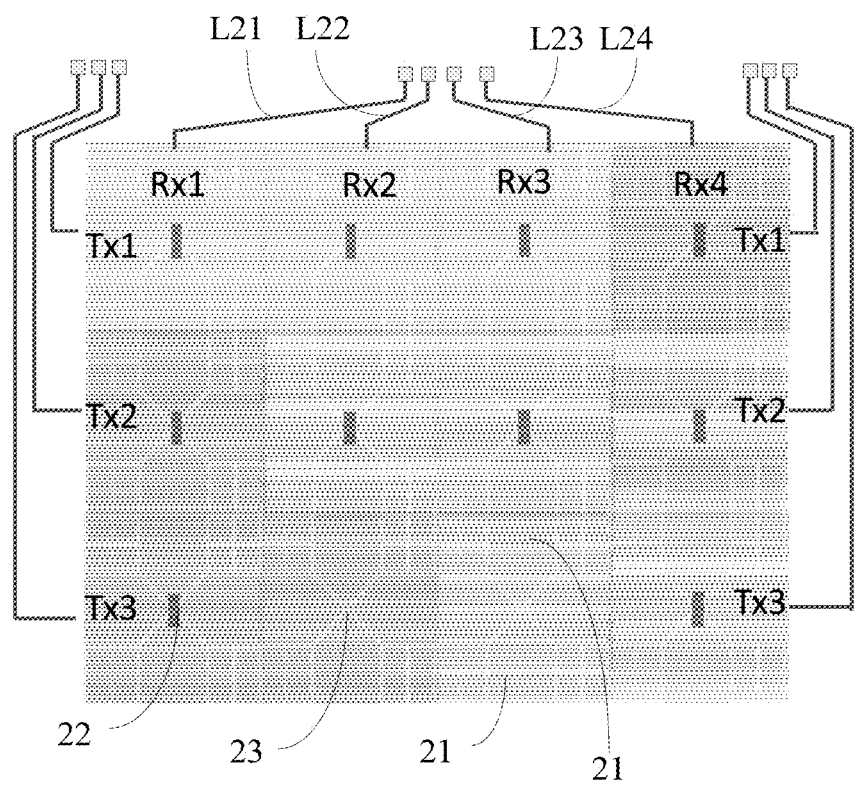
FIG. 4 is the second schematic plan view of the specific embodiment.

Refer to FIG. 3 and FIG. 4. The embodiment provides an example to illustrate the balance on the mutual capacitance of the first touch electrode strings Tx1-Txn and second touch electrode strings Rx1-Rxn. For example, the touch sensor 100 comprises three first touch electrode strings, e.g. TX1, TX2 and TX3, and four second touch electrode strings, e.g. RX1, RX2, RX3, and RX4. The length of the wiring L13 connecting the first touch electrode string TX3 and the corresponding pad is longer than the wiring L12 connecting the first touch electrode string TX2 and the corresponding pad. The length of the wiring L12 connecting the first touch electrode string TX2 and the corresponding pad is longer than the wiring L11 connecting the first touch electrode string TX1 and the corresponding pad. The length of the wiring L21 connecting the second touch electrode string RX1 and the corresponding pad is not only equal to the wiring L24 connecting the second touch electrode string RX4 and the corresponding pad but also longer than the wiring L22 connecting the first touch electrode string RX4 and the corresponding pad. The length of the wiring L22 connecting the second touch electrode string RX2 and the corresponding pad is equal to the length the wiring L23 connecting the second touch electrode string RX3 and the corresponding pad. Thus, the first touch electrode string TX3 is connected to four first conductive bridges 12. The first touch electrode string TX2 is connected to two first conductive bridges 12 and two second touch electrodes 13. The first touch electrode string TX1 comprises one first conductive bridge 12 and three second conductive electrodes 13. The second touch electrode string RX1 comprises three third conductive electrodes 22. The second touch electrode string RX2 is connected to two third conductive electrodes 22 and one fourth conductive electrode 23. The third touch electrode string RX3 is connected to two third conductive electrodes 22 and one fourth conductive electrode 23. The fourth touch electrode string RX4 is connected to three third conductive electrodes 22. Thus the mutual capacitance of the first touch electrode strings TX1, TX2, and TX3 is balanced and the mutual capacitance of the second touch electrode strings RX1, RX2, RX3 and RX4 is also balanced, thereby increasing the touching performance of the touch sensor.

Figure 5:
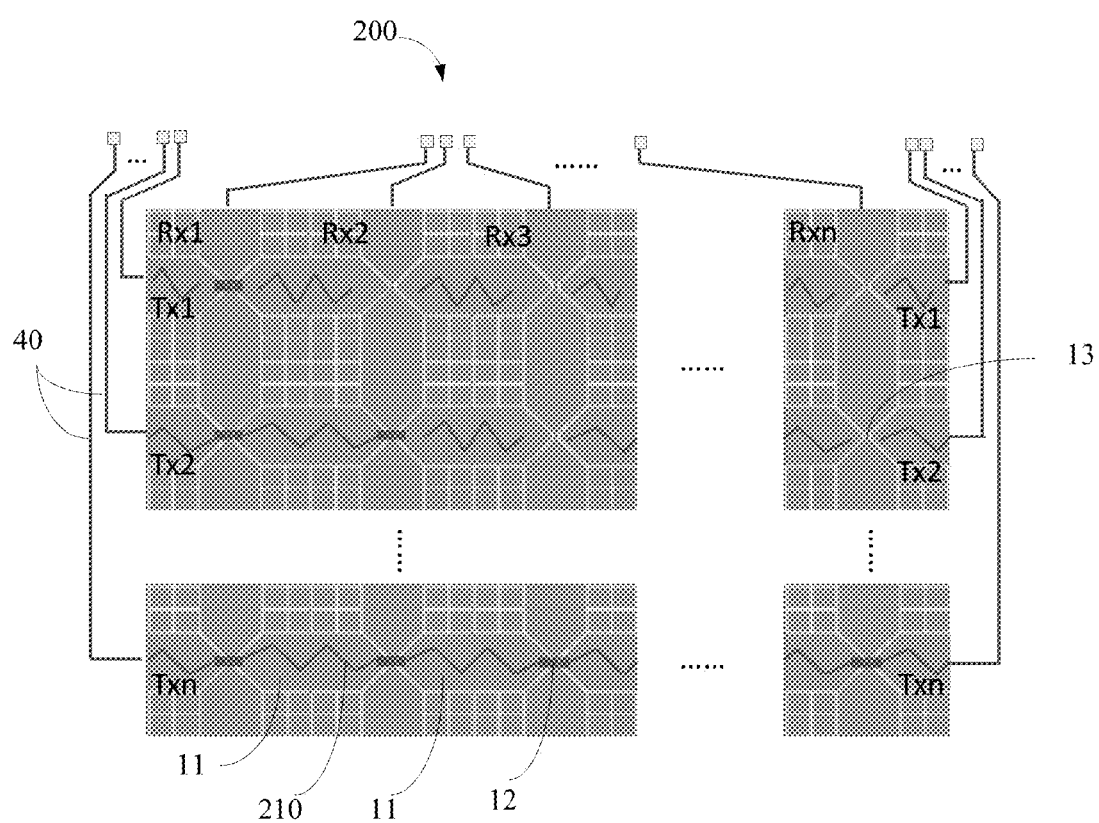
FIG. 5 is the first schematic plan view of the touch sensor according to the second embodiment of the first solution of the disclosure.
Figure 6:
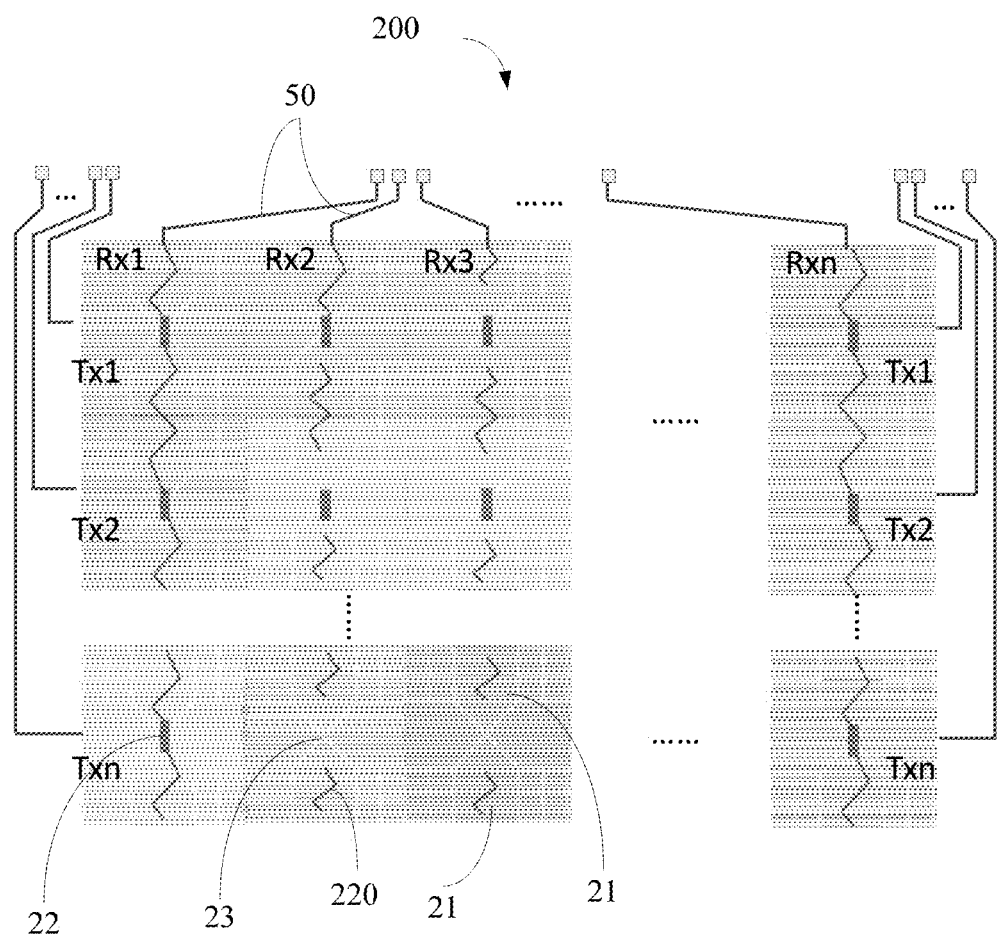
FIG. 6 is the first schematic plan view of the touch sensor according to the second embodiment of the second solution of the disclosure.

Continuously refer to FIG. 5 and FIG. 6. The second embodiment of the present disclosure provides a touch sensor 200. The touch sensor 200 in the second embodiment is similar to the touch sensor 100 in the first embodiment. The difference is that the touch sensor 200 in the second embodiment comprises first conductive mediums 210 and second conductive mediums 220. First conductive mediums 210 are disposed in the first touch electrode 11 of the first touch electrode string to adjust the mutual capacitance of the first touch electrode strings Tx1-Txn so that the mutual capacitance of the first touch electrode strings Tx1-Txn are in the same value or the difference between the mutual capacitance of the first touch electrode strings is within the first predetermined range. Second conductive mediums 220 are disposed in the second touch electrode 21 of the second touch electrode strings Rx1-Rxn to adjust the mutual capacitance of the second touch electrode strings Rx1-Rxn so that the mutual capacitance of the second touch electrode strings Rx1-Rxn is in the same value or the difference between the mutual capacitance of the second touch electrode strings is within the second predetermined range.

Specifically, the number of the first conductive mediums 210 disposed in the first touch electrode strings Tx1-Txn is directly proportional to the length of the corresponding wiring connecting the first touch electrode strings Tx1-Txn. The number of the second conductive mediums 220 disposed in the second touch electrode strings Rx1-Rxn is directly proportional to the length of the corresponding wiring connecting the second touch electrode strings Rx1-Rxn.

The first conductive mediums 210 disposed in the first touch electrode strings Tx1-Txn and the second conductive mediums 220 disposed in the second touch electrode strings Rx1-Rxn would decrease the resistance of the first and second touch electrode strings. The more amount of the first conductive mediums 210 disposed in the first touch electrode strings Tx1-Txn would result in the greater extent of decrease the resistance. The more amount of the second conductive mediums 220 disposed in the second touch electrode strings Rx1-Rxn would result in the greater extent of decrease of the resistance. Therefore, the amount of the first conductive mediums 210 disposed in first touch electrode strings Tx1-Txn is directly proportional to the length of corresponding wirings connecting first touch electrode strings Tx1-Txn. The amount of the second conductive mediums disposed in the second touch electrode strings Rx1-Rxn is directly proportional to the length of corresponding wirings connecting the second touch electrode strings Rx1-Rxn. It may make the mutual capacitance be balanced and increase the performance of the touch sensor 200.

In the present embodiment, the first conductive mediums in the plurality of first touch electrode strings Tx1-Txn are metal wire. The second conductive mediums in the plurality of second touch electrode strings Rx1-Rxn are metal wire. The length of the metal wire disposed in the first touch electrode strings Tx1-Txn is directly proportional to the length of the corresponding wiring connecting the first touch electrode strings Tx1-Txn. The length of the metal wire disposed in the second touch electrode strings Rx1-Rxn is directly proportional to the length of the corresponding wiring connecting the second touch electrode rings Rx1-Rxn.

The metal wire may be disposed in all or part of the first touch electrodes 11 in the first touch electrode strings. Similarly, the metal wire may be disposed in all of part of the second touch electrodes 12 in the second touch electrode string. The amount of the length of the metal wires disposed in the first touch electrode strings Tx1-Txn and the second touch electrode strings Rx1-Rxn is the sum of the length of the metal wire in the first touch electrode strings. The longer length of the metal wires is disposed in the first touch electrode strings Tx1-Txn and the second touch electrode strings Rx1-Rxn would result in the greater extent of decrease of the resistance. Therefore, the length of the metal wires disposed in the first touch electrode strings Tx1-Txn is directly proportional to the length of the corresponding wirings connecting the first touch electrode strings Tx1-Txn. The length of the wires disposed in the second touch electrode strings Rx1-Rxn is directly proportional to the length of the corresponding wirings connecting the second touch electrode strings Rx1-Rxn. It may make mutual capacitance be balanced and increase the performance of the touch sensor 200.

Further, the touch sensor 200 further comprises an upper substrate (not shown). The plurality of the first touch electrode strings Tx1-Txn and the second touch electrode strings Rx1-Rxn are formed on the upper substrate.

Figure 7:
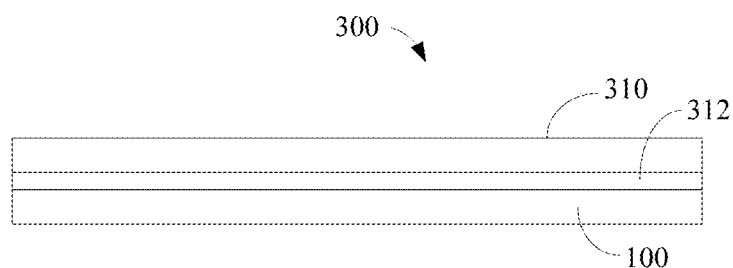
FIG. 7 is the schematic view of the display device of the embodiment of the second solution of the disclosure.

Refer to FIG. 7. The second scheme of the embodiment of the present disclosure provides a display device 300. The display device 300 comprises a display panel 310, a sealant 320 and a touch sensor. The touch sensor can be provided as the touch sensor 100 in the first embodiment of the first solution.

The touch sensor also can be provided as the touch sensor 200 in the second embodiment of the first solution. Since the touch sensor 100 and 200 have been specifically described in the first and second embodiment of the first solution, the related description is not repeated herein.

In the present embodiment, the touch sensor 100 comprises a plurality of first touch electrode strings Tx1-Txn arranged in parallel and a plurality of second touch electrode strings Rx1-Rxn arranged in parallel, wherein the second touch electrode strings Rx1-Rxn are isolated from the first touch electrode strings Tx1-Txn. Each first touch electrode string comprises the same number of first touch electrodes 11. The first touch electrodes 11 are arranged in the first direction I1. The first conductive bridge 12 or the second conductive bridge 13 connects two adjacent first touch electrodes 11 in the first touch electrode strings. The resistance of the first conductive bridge 12 is different from the resistance of the second conductive bridge 13 to adjust the mutual capacitance between the plurality of first touch electrode string Tx1-Txn so that mutual capacitance in the plurality of first touch electrode strings Tx1-Txn is in the same value or the difference of the mutual capacitance between the plurality of first touch electrode strings Tx1-Txn is within the first predetermined range.

Each second touch electrode string comprises the same number of second touch electrodes 21 arranged in the second direction I2 crossing with the first direction I1. The third conductive bridge 22 or the fourth conductive bridge 23 connects two adjacent second touch electrodes 21 in the second touch electrode strings; wherein the resistance of the third conductive bridge 22 is different from the resistance of the fourth conductive bridge 23 to adjust the mutual capacitance in the plurality of second touch electrode strings Rx1-Rxn so that the mutual capacitance in the plurality of second touch electrode strings Rx1-Rxn is in the same value or the difference of the mutual capacitance between the plurality of second touch electrode strings Rx1-Rxn is within a second predetermined range. Therefore, the mutual capacitance in the plurality of first touch electrode strings Tx1-Txn and the second touch electrode strings Rx1-Rxn is in the same value or the difference of the mutual capacitance between the plurality of first touch electrode strings Tx1-Txn and second touch electrode rings Rx1-Rxn is within the first and second predetermined range respectively such that the mutual capacitance of the touch sensor 100 are balanced and the touch performance of the touch sensor 100 is increased.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A touch sensor for a display device, comprising: a plurality of first touch electrode strings arranged in parallel; each first touch electrode string comprising the same number of first touch electrodes arranged in a first direction; a first conductive bridge and a second conductive bridge connecting two adjacent first touch electrodes in the first touch electrode strings respectively; wherein the resistance of the first conductive bridge is different from the resistance of the second conductive bridge to adjust the mutual capacitance between the plurality of the first touch electrode strings such that the mutual capacitance between the plurality of the first touch electrode strings is in the same value or the difference of the mutual capacitance between the plurality of the first touch electrode strings is within a first predetermined range; the number of the first touch electrode strings is a natural number and larger then 1; and a plurality of second touch electrode strings isolated from the plurality of first touch electrode strings; each second touch electrode string comprising the same number of second touch electrodes arranged in a second direction crossing the first direction; a third conductive bridge and a fourth conductive bridge connect two adjacent second touch electrodes in the second touch electrode strings respectively; wherein mutual capacitance in the plurality of second touch electrode strings are adjusted according to the difference between a resistance of the third conductive bridge and a resistance of the fourth conductive bridge so that mutual capacitance are in the same value or the difference between the mutual capacitance is within a second predetermined range.

2. The touch sensor according to claim 1, further comprising:
 a pad group;
 a first group of wiring corresponding to the plurality of first touch electrode strings; each first touch electrode string connecting a corresponding pad of the pad group through a corresponding wiring in the first group wiring;
 a second group of wiring corresponding to the plurality of second touch electrode strings; each second touch electrode string connecting a corresponding pad of the pad group through a corresponding wiring in the second group wiring;
 wherein the pad group, the first group of wiring, and the second group of wiring are disposed at the external region of a region formed by the first touch electrode strings and the second touch electrode strings;
 wherein the number of the first conductive bridges connecting the first touch electrode string is directly proportional to the length of the corresponding wiring connecting the first and the second touch electrode string when the resistance of the first conductive bridges is smaller than the conductivity of the second conductive bridges.

3. The touch sensor according to claim 2, further comprising:
 a first conductive medium disposed in the first touch electrode of the first touch electrode string to adjust the mutual capacitance of the plurality of first touch electrode strings so that the mutual capacitance of the plurality of first touch electrode string is in the same value or the difference between the mutual capacitance of the plurality of the first touch electrode string is within the first predetermined range; and
 a second conductive medium disposed in the second touch electrode of the plurality of second touch electrode string to adjust the plurality of the mutual capacitance of the plurality of second touch electrode strings so that the mutual capacitance of the plurality of the second touch electrode string is in the same value or the difference between the mutual capacitance of the plurality of second touch electrode string is within the second predetermined range.

4. The touch sensor according to claim 3, wherein in the plurality of first touch electrode strings and the plurality of second touch electrode strings, the amount of the first conductive medium disposed in the first touch electrode string is directly proportional to the length of the corresponding wiring connecting the first touch electrode string; the amount of the second conductive medium disposed in the second touch electrode string is directly proportional to the length of the corresponding wiring connecting the second touch electrode string.

5. The touch sensor according to claim 3, wherein the first and second conductive medium in the plurality of first and second touch electrode string is metal wire respectively; the total length of the metal wire disposed in the first and the second touch electrode string is directly proportional to the length of the corresponding wiring connecting the first and the second touch electrode string respectively.

6. The touch sensor according to claim 1, wherein the material of the first conductive bridge and the material of the third conductive bridge are the same; the material of the second conductive bridge and the material of the fourth conductive bridge are the same.

7. The touch sensor according to claim 6, wherein the material of the first conductive bridge and the material of the third conductive bridge are metal; the material of the second conductive bridge and the material of the fourth conductive bridge are Indium Tin Oxide.

8. The touch sensor according to claim 1, wherein the first predetermined range and the second predetermined range are the same.

9. The touch sensor according to claim 1, further comprising an upper substrate; wherein the plurality of first touch electrode strings and the plurality of second touch electrode strings are formed on the upper substrate.

10. A display device, comprising a display panel, a sealant and a touch sensor; the sealant for adhering the touch sensor to the display panel, the touch sensor comprising: a plurality of first touch electrode strings arranged in parallel; each first touch electrode string comprising the same number of first touch electrodes arranged in a first direction; a first conductive bridge and a second conductive bridge connecting two adjacent first touch electrodes in the first touch electrode strings respectively; wherein the resistance of the first conductive bridge is different from the resistance of the second conductive bridge to adjust the mutual capacitance between the plurality of the first touch electrode strings such that the mutual capacitance between the plurality of the first touch electrode strings is in the same value or the difference of the mutual capacitance between the plurality of the first touch electrode strings is within a first predetermined range; the number of the first touch electrode strings is a natural number and larger then 1; and a plurality of second touch electrode strings isolated from the plurality of first touch electrode strings; each second touch electrode string comprising the same number of second touch electrodes arranged in a second direction crossing the first direction; a third conductive bridge and a fourth conductive bridge connect two adjacent second touch electrodes in the second touch electrode strings respectively; wherein mutual capacitance in the plurality of second touch electrode strings are adjusted according to the difference between a resistance of the third conductive bridge and a resistance of the fourth conductive bridge so that mutual capacitance are in the same value or the difference between the mutual capacitance is within a second predetermined range.

11. The display device according to claim 10, wherein the touch sensor further comprising:
 a pad group;
 a first group of wiring corresponding to the plurality of first touch electrode strings; each first touch electrode string connecting a corresponding pad of the pad group through a corresponding wiring in the first group wiring;
 a second group of wiring corresponding to the plurality of second touch electrode strings; each second touch electrode string connecting a corresponding pad of the pad group through a corresponding wiring in the second group wiring;
  wherein the pad group, the first group of wiring, and the second group of wiring are disposed at the external region of a region formed by the first touch electrode strings and the second touch electrode strings;
  wherein the number of the first conductive bridges connecting the first touch electrode string is directly proportional to the length of the corresponding wiring connecting the first and the second touch electrode string when the resistance of the first conductive bridges is smaller than the conductivity of the second conductive bridges.

12. The display device according to claim 11, wherein the touch sensor further comprising:
 a first conductive medium disposed in the first touch electrode of the first touch electrode string to adjust the mutual capacitance of the plurality of first touch electrode strings so that the mutual capacitance of the plurality of first touch electrode string is in the same value or the difference between the mutual capacitance of the plurality of the first touch electrode string is within the first predetermined range; and
 a second conductive medium disposed in the second touch electrode of the plurality of second touch electrode string to adjust the plurality of the mutual capacitance of the plurality of second touch electrode strings so that the mutual capacitance of the plurality of the second touch electrode string is in the same value or the difference between the mutual capacitance of the plurality of second touch electrode string is within the second predetermined range.

13. The display device according to claim 12, wherein in the plurality of first touch electrode strings and the plurality of second touch electrode strings, the amount of the first conductive medium disposed in the first touch electrode string is directly proportional to the length of the corresponding wiring connecting the first touch electrode string; the amount of the second conductive medium disposed in the second touch electrode string is directly proportional to the length of the corresponding wiring connecting the second touch electrode string.

14. The display device according to claim 12, wherein the first and second conductive medium in the plurality of first and second touch electrode string is metal wire respectively; the total length of the metal wire disposed in the first and the second touch electrode string is directly proportional to the length of the corresponding wiring connecting the first and the second touch electrode string respectively.

15. The display device according to claim 10, wherein the material of the first conductive bridge and the material of the third conductive bridge are the same; the material of the second conductive bridge and the material of the fourth conductive bridge are the same.

16. The display device according to claim 15, wherein the material of the first conductive bridge and the material of the third conductive bridge are metal; the material of the second conductive bridge and the material of the fourth conductive bridge are Indium Tin Oxide.

17. The display device according to claim 10, wherein the first predetermined range and the second predetermined range are the same.

18. The display device according to claim 10, the touch sensor further comprising an upper substrate; wherein first touch electrode strings and second touch electrode strings are formed on the upper substrate.

* * * * *